United States Patent [19]

Marciniak et al.

[11] 3,991,011

[45] Nov. 9, 1976

[54] FLAME RETARDANT POLYMERIC COMPOSITIONS CONTAINING HALOGENATED DIELS-ADLER ADDUCTS WITH FURAN

[75] Inventors: Harry W. Marciniak, Tonawanda; Richard D. Carlson, Grand Island; James L. Dever, Lewiston, all of N.Y.

[73] Assignee: Hooker Chemicals & Plastics Corporation, Niagara Falls, N.Y.

[22] Filed: Oct. 18, 1971

[21] Appl. No.: 190,271

Related U.S. Application Data

[63] Continuation-in-part of Ser. No. 157,627, June 28, 1971, abandoned, which is a continuation of Ser. No. 847,430, Aug. 4, 1969, abandoned.

[52] U.S. Cl. .................... 260/45.8 A; 260/2.5 FP; 260/30.4 R
[51] Int. Cl.$^2$........................................... C08K 5/15
[58] Field of Search............................. 260/45.8 A

*Primary Examiner*—Paul R. Michl
*Attorney, Agent, or Firm*—Peter F. Casella; James F. Mudd

[57] ABSTRACT

Polymeric materials having fire retardancy and improved properties are provided by incorporating therein, Diels-Alder diadducts of polyhalogenated cyclopentadienes and a substituted or non-substituted furan.

52 Claims, No Drawings

FLAME RETARDANT POLYMERIC COMPOSITIONS CONTAINING HALOGENATED DIELS-ADLER ADDUCTS WITH FURAN

REFERENCE TO PRIOR APLICATION

This is a continuation-in-part of copending application Ser. No. 157,627, filed June 28, 1971 now abandoned which is a continuation of copending application Ser. No. 847,430, filed Aug. 4, 1969, now abandoned.

BACKGROUND OF THE DISCLOSURE

The use of organic compositions, particularly those grouped together in the broad class of polymeric materials and coatings, is expanding each year. These materials find wide application as wire coatings, pipes, conduits and other industrial moldings and extruded products, as well as in paints, films, coatings, and miscellaneous products. These and other uses are better served by polymeric compositions that are fire retardant or flame resistant. It has now unexpectely been found that DielsAlder adducts of polyhalogenated cyclopentadienes and substituted or unsubstituted furans will provide a polymeric composition having fire retardancy and improved properties.

Accordingly, it is the object of this invention to provide fire retardant polymeric compositions. It is also the object of this invention to provide fire retardant polymeric compositions which have improved properties. These and other objects will become apparent to one skilled in the art from the following detailed description.

SUMMARY OF THE INVENTION

This invention relates to polymeric compositions having fire retardancy and improved properties. More particularly, this invention relates to polymeric compositions having fire retardancy and improved properties which are provided by incorporating therein Diels-Alder adducts of polyhalogenated cyclopentadienes and substituted or non-substituted furans.

DESCRIPTION OF THE PREFERRED EMBODIMENTS

In accordance with this invention, there are provided fire retardant compositions by incorporating into the polymeric material, a fire retardant amount of a Diels-Alder adduct of a polyhalogenated cyclopentadiene and a furan compound. The polyhalogenated cyclopentadiene compounds have the formula

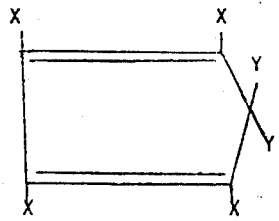

wherein X is selected from the group consisting of fluorine, chlorine, and bromine and Y is selected from the group consisting of fluorine, chlorine, bromine, alkyl of 1 to 10 carbon atoms and alkoxy of 1 to 10 carbon atoms, said cyclopentadiene containing at least 4 and preferably 6 halogen substituents. The alkyl and alkoxy radicals preferably have 1 to 6 carbon atoms and can be halo substituted, i.e., with fluorine, chlorine or bromine.

The polyhalogenated cyclopentadienes suitable for use in this invention include hexachlorocyclopentadiene; 5,5-dimethoxytetrachlorocyclopentadiene; hexabromocyclopentadiene; 5,5-dibromotetrachlorocyclopentadiene; 5,5-difluorotetchlorocyclopentadiene; 5,5-diethoxytetrachlorocyclopentadidne; 5,5-dimethyltetrachlorocyclopentadiene, 5-chloromethylpentachlorocyclopentadiene; 5-chloroethoxypentachlorocyclopentadiene; and the like. Of these, hexachlorocyclopentadiene is preferred.

The furan compounds which are adducted with the polyhalogenated cyclopentadienes are of the formula:

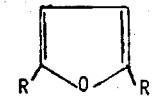

wherein R is indivdually selected from the group consisting of hydrogen and alkyl of 1 to 6 carbon atoms. Thus the furan compound can be furan itself, 1-methyl furan, 1-propyl furan, 1-heptyl furan, 1,4-dipropyl furan, 1-methyl-4-isobutyl furan, and the like. Of these, furan is preferred.

The diadducts of the polyhalogenated cyclopentadiene and furan compound can be prepared by the process of copending application Serial No. 847,408, filed August 4, 1969. Generally, they are of the formula:

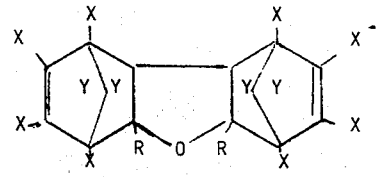

wherein X, Y and R are as hereinbefore defined. Typical diadducts of the foregoing formula include: 1,2,3,4,5,6,7,8,9,10,10,11,11-dodecachloro1,4,4a,-5a,6,9,9a,9b-ocyahydro-1,4:6,9-dimethanodibenzofuran, viz.

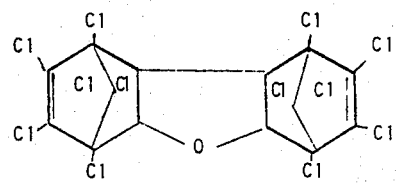

hereafter referred to as F-2C:

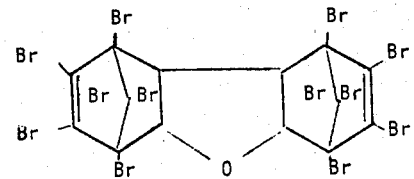

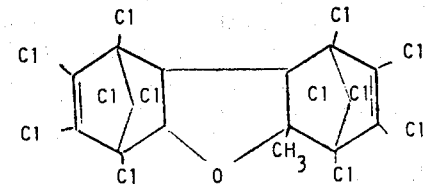

and the like diadducts. For convenience, hereinafter the diadducts of the polyhalogenated cyclopentadiene and furan compound will be denoted "DPCF". The preferred DPCF is F-2C which has a melting point of about 290° centigrade.

The polymers embraced within the scope of this invention include the homopolymers and copolymers of unsaturated aliphatic, alicyclic, and aromatic hydrocarbons. Suitable monomers are ethylene, propylene, butene, pentene, hexene, heptene, octene, 2-methylpropene-1, 3-methylbutene-1, 4-methylpentene-1, 4-methylhexene-1, 5-methyhexene-1, bicyclo-(2,2,1)-2-heptene, butadiene, pentadiene, hexadiene, isoprene, 2,3-dimethylbutadiene-1,3, 2-methylpentadiene-1,3, 4-vinylcyclohexene, vinylcyclohexene, cyclopentadiene, styrene and methylstyrene, and the like.

Other polymers in addition to the above-described olefin polymers that are useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins and paint vehicles, such as bodied linseed oil; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolicpolyamide, and phenolic-vinyl acetals; polyamide polyamide polymers, such as polyamide-epoxy and particularly long chain synthetic polymeric amides containing recurring carbonamide groups as an integral part of the main polymer chain; polyester resins such as unsaturated polyesters of diabasic acids and dihydroxy compounds, and polyester elastomer and resorcinol resins such s resorcinolformaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bisphenols, phosgene, thermoplastic polymers of bisphenols and epichlorhydrin (trade named Phenoxy polymers); graft copolymers and polymers of unsaturated hydrocarbons and unsaturated monomer, such as graft copolymers of polybutadiene, styrene and acrylonitrile, commonly called ABS resins; ABS polyvinyl chloride polymers, recently introduced under the trade name of Cycovin; and acrylic polyvinyl chloride polymers, known by the trade name Kydex 100.

The polymers of the invention can be in various physical forms, such as shaped articles, for example, moldings, sheets, rods, and the like; fibers, coatings, films and fabrics, and the like.

In comparison to other Diels-Alder adducts, the DPCFs have been found to have particular utility in ABS resins and in elastomeric materials such as acrylic rubber; acrylonitrilebutadiene styrene terpolymers; butadiene-acrylonitrile copolymers; butyl rubber; chlorinated rubbers, e.g., polyvinyl chloride resins, chloroprene rubber, chlorsulfonated polyethylene; ethylene polymers, e.g., ethylene-propylene copolymers, ethylene-propylene terpolymers; fluorinated rubbers, butadiene rubbers, e.g., styrenebutadiene rubber, isobutylene polymers, polybutadiene polymers, polyisobutylene rubbers, polyisoprene rubbers; polysulfide rubbers; silicon rubbers; urethane rubbers; high styrene resin latices, high styrene resins, vinyl resins; sponge rubber; and the like. It has been found that the compositions exhibit surprising fire retardancy, resistance to color degradaton, impact strength, tensile strength and flexural strength.

The halogenated Diels-Alder adducts in the present compositions are desirably incorporated in the polymeric materials in an effective fire retardant amount. Generally, halogenated Diels-Alder adducts in the amount of from about 2 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds, wherein the metal is selected from the group consisting of antimony, aresenic and bismuth, in the polymeric compositions in the amount of about 1 to about 30 percent by weight of said polymeric composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonous acids and their pentavalent derivatives. It is convenient to use sodium antimonite and potassium antimonite when it is desired to use and alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caparate, antimony cinnamate, antimony anisate, and their pentavalent dihalide derivatives. Likewise, the esters of antimonous acids and their pentavalent derivatives disclosed in U.S. Pat. No. 2,993,924 such as tris(n-octyl) antimonite, tris(2-ethylhexyl) antimonite, tribenzyl antimonite, tris(beta-chloroethyl) antimonite, and their pentavelent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually the additives are mixed with the polymer in the molten state and temperatures that can range from the melting point to the decomposition temperature of the polymer, e.g., from 20° to 315° centigrade. Alternatively, the additives and polymer are dry-blended in the finely-divided state so that an intimate mixture is obtained upon subsequent molding or extrusion.

The following examples serve to illustrate the invention but are not intended to limit it. Unless specified otherwise in this specification and claims, all temperatures are in degrees centigrade and parts are understood to be expressed in parts by weight. In these examples, the fire retardant nature of the test specimen was determined in accordance with ASTM D635-56T test procedure. Also in these examples, the following abbreviations were used for the following compounds: 1,5 COD was used for

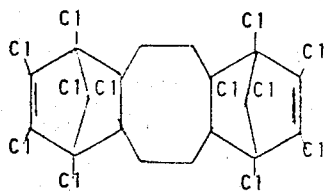

CP was used for

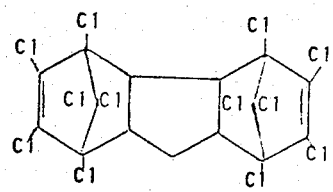

DCP was used for

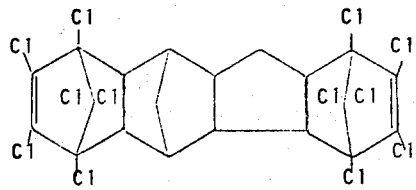

BCH was used for

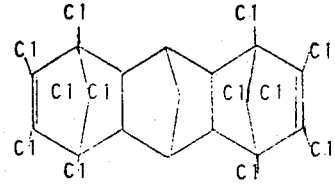

The following properties were determined by the following tests: Impact Strengt - ASTM D256-56; Tensile Strength - ASTM D638-61T; Flexural Strength - ASTM D790-61.

In all of the following examples, as in polymers generally, the F-2C exhibited a high degree of resistance to migration.

EXAMPLE I

Test compositions were prepared by compounding 70 parts of ABS resin, 22 parts of Diels-Alder adduct and 8 parts of antimony trioxide and then testing the compositions for fire retardancy, impact strength, tensile strength and flexural strength. The test results are given in Table I.

TABLE I

| Adduct | Self-Extinguishing Time, seconds | Impact Strength, ft. lbs. | Tensile Strength, psi | Flexural Strength, psi |
|---|---|---|---|---|
| F-2C | 1.6 | 1.129 | 4660 | 8345 |
| CP | 1.8 | 0.873 | 4314 | 8182 |

The results of these tests were very surprising in that F-2C composition exhibited about 2 percent higher flexural strength, about 8 percent higher tensile strength, and about 29 percent higher impact strength than the CP composition. While both compounds are polycyclic diadducts of hexachlorocylopentadiene, and the CP adduct has a melting point about 30° higher than F-2C, these differences in results cannot be explained thereby because the impact, tensile and flexural strengths were determined at a temperature below the melting point of the adducts. Thus, prior to the invention, the two adducts would have been expected to behave identically.

EXAMPLE II

Identical test bars were prepared containing ABS resin, Diels-Alder adduct and antimony trioxide. The adducts employed were F-2C, CP and 1,5 COD. The bars were tested for stability be exposing them to a various increasing temperatures and examining the bar for degradation. Degradation was determined by the discoloration in the bar. At about 177° and about 205° centigrade the CP bars showed very noticeably discoloration while the F-2C bars developed a color which was only slightly noticeable. At about 232° degrees centigrade, the F-2C bar had slightly noticeable discoloration while the CP bar had a very noticeable discoloration and the 1,5 COD discoloration was greater than the CP. At 260° centigrade, the F-2C bar had developed a light discoloration while the CP bar was very dark and the 1,5 COD bar was the darkest of the three.

EXAMPLE III

Test bars were prepared by compounding 100 parts of styrenebutadiene rubber, 30 parts adduct and 10 parts of antimony trioxide and tested for fire retardancy and tensile strength. The adducts and results are given in Table II.

TABLE II

| Adduct | Self-Extinguishing Time, seconds | Tensile Strength psi |
|---|---|---|
| F-2C | 3.4 | 2460 |
| CP | 5.1 | 2380 |
| BCH | 6.0 | 2250 |
| DCP | >18.0 | 2300 |

The test results show that the composition containing the F-2C had the greatest fire retardancy and the highest tensile strength. The higher tensile strength is particularly surprising because the test was carried out at a temperature below the melting point of any of the adducts and therefore, the F-2C test sample would not have been expected to exhibit these characteristics.

EXAMPLE IV

Test bars were prepared containing 100 parts of terpolymer of ethylene, propylene and a diene (EPDM), 30 parts adduct and 15 parts antimony trioxide and tested for fire retardency and tensile strength. The adducts and results of the test are given in Table III.

TABLE III

| Adduct | Self-Extinguishing Time, seconds | Tensile Strength psi |
|---|---|---|
| F-2C | 9.5 | 1720 |
| CP | 15.5 | 1540 |
| BCH | 11.3 | 1520 |
| DCP | 18.8 | 1670 |

The test results demonstrate that F-2C was the most efficient adduct for imparting fire retardancy and retaining tensile strength of the base elastomeric compositon. The tensile strength was particularly surprising because the test was conducted at a temperature below that at which any of the adducts melted.

EXAMPLE V

Compositions were prepared by compounding 100 parts butyl rubber, 30 parts adduct and 15 parts antimony trioxide and tested for fire retardancy. The adduct results are given in Table IV.

TABLE IV

| Adduct | Self-Extinguishing time, seconds |
|---|---|
| F-2C | 1.1 |
| CP | 2.6 |
| BCH | 8.5 |
| DCP | 2.9 |

The tests show that F-2C adduct exhibited a self-extinguishing time of less than half that exhibited by CP, the best of the other adducts tested.

EXAMPLE VI

Test bars were prepared by compounding 100 parts of SBR sponge rubber, 33.3 parts adduct and 10.8 parts of antimony trioxide and tested for fire retardancy. A composition containing the F-2C adduct self-extinguished in about 15 seconds while a composition containing the CP adduct was still burning after 45 seconds had elapsed.

EXAMPLE VII

Compositions were prepared by compounding 70 parts of ABS, 20 parts of the following adducts and 10 parts antimony trioxide to yield compositions which are fire retardant by the ASTM D635 test method. The adducts tested were

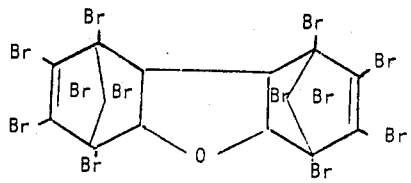

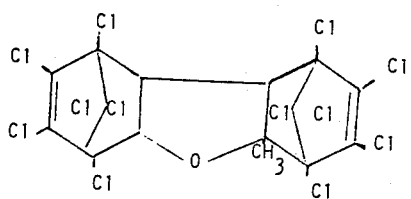 and

EXAMPLE VIII

A composition was prepared by compounding 60 parts of ABS and 40 percent of F-2C adduct and tested for fire retardancy by the ASTM D635 method modified by hand molding in a glass tube. The test samples exhibited an average self-extinguishing time of 1.7 seconds, had no afterglow (red glow after extinguishment of the flame) and did not drip.

EXAMPLE IX

Compositions were prepared by compounding 80 parts of polystyrene, 15 parts of F-2C adduct and 5 parts of antimony trioxide and alternately 80 parts of polystyrene and 15 parts of F-2C adduct to yield compositions which were flame retardant by the ASTM D-635 test method. The composition containing antimony trioxide had a flame out time of 2 seconds while the composition containing no antimony trioxide had a flame out time of 15 seconds.

EXAMPLE X

Compositions were prepared by compounding 65 parts of high density polyethylene, 23.3 parts F-2C adduct and 11.7 parts of antimony trioxide and alternately 60 parts of low density polyethylene, 26.7 parts of F-2C adduct and 13.3 parts of antimony trioxide to yield compositions which were flame retardant by the ASTM D-635 test method. The compound containing high density polyethylene had a self-extinguishing time of 9 seconds while the composition containing low density polyethylene had a flame out time of 9.3 seconds.

EXAMPLE XI

A composition was prepared by compounding 70 parts of an ethylene-propylene copolymer sold under the tradename "Tenite 5B21" by the Tennessee Eastman Company, 20 parts of F-2C adduct and 10 parts of antimony trioxide to yield a composition which was fire retardant by the ASTM D-635 test method. Self-extinguishing time was 1.4 seconds.

EXAMPLE XII

A composition was prepared using 90 parts of nylon 66 and 10 parts of F-2C adduct to yield a composition which was fire retardant by the ASTM D-635 test method. Self-extinguishing time for the composition was 1 second.

EXAMPLE XIII

A composition was prepared by compounding 60 parts of polymethylmethacrylate sold under the tradename "Lucite" by the E. I. duPont de Nemours Company, 26.7 parts of F-2C adduct and 13.3 parts of antimony trioxide to yield a composition which was fire retardant by the ASTM D-635 test method. The self-extinguishing time for the composition was 1.4 seconds.

EXAMPLE XIV

A composition was prepared by compounding 100 parts of a polyvinyl chloride polymer sold under the tradename "Geon 103-EP" by the B. F. Goodrich Chemical Company, 50 parts of dioctylphthalate, 5 parts of a dibasic lead phosphite sold under the tradename "Dyphos" by the National Lead Company, 10 parts of F-2C adduct and 5 parts of antimony trioxide to yield a composition which was fire retardant by the ASTM D-1433-58 test method. The self-extinguishing time was 8.2 seconds.

EXAMPLE XV

A composition was prepared by compounding 100 parts of a general purpose polyester sold under the tradename of "Hetron 130" by the Hooker Chemical Corporation, 20 parts of F-2C adduct, 2 parts of benzoyl peroxide sold under the tradename "LUPERCO ATC" by Lucidol Company, and 10 parts of antimony trioxide to yield a composition which was fire retardant by the ASTM D-635 test method. The self-extinguishing time was between 0 and 1 second.

EXAMPLE XVI

A composition was prepared by compounding 100 parts of natural rubber, 25 parts of carbon black, 3 parts of zinc oxide, 2 parts of a rubber stabilizer sold under the tradename "Age Rite Resin D" by the R.T. Vanderbilt Company, 2 parts of sulfur, 0.8 part of N-t-butyl-2-benzothiazolesulfenamide sold under the tradename "Santocure NS" by the Monsanto Chemial Company, 30 parts of F-2C adduct and 15 parts of antimony trioxide to yield compositions which when cured 40 minutes at 280° F provided compositions which are fire retardant by the ASTM D-635 test method with a self-extinguishing time of 5 seconds.

EXAMPLE XVII

A composition was prepared by compounding and curing 30 minutes at 320° F, 100 parts of a polybutadiene rubber sold under the tradename "Ameripol CB880" by the B. F. Goodrich Chemial Company, 50 parts of carbon black, three parts of zinc oxide, 1.5 parts of N-cyclohexyl-2-benzothiazolesulfenamide sold under the tradename "Santocure" by the Monsanto Chemical Company, 1.5 parts of sulfur, 40 parts F-2C adducts and 20 parts of antimony trioxide to yield a composition which was fire retardant by the ASTM D-635 test method. The composition showed a self-extinguishing time of 5.3 seconds.

EXAMPLE XVIII

A composition was prepared and cured 30 minutes at 320° F of a compound consisting of 100 parts of a nitrile butadiene rubber containing 30% acrylonitrile sold under the tradename of "Hycar 1042" by the B. F. Goodrich Chemical Company, 40 parts of carbon black, 5 parts of zinc oxide, 3.5 parts of tetramethyl thiuramdisulfide sold under the tradename of "TUEX" by the Uniroyal Chemical Company, 1 part of stearic acid, 30 parts of F-2C adduct and 15 parts of antimony trioxide to yield a composition which, when tested after curing, was fire retardant by the ASTM D-635 test method having a self-extinguishing time of 3.7 seconds.

EXAMPLE XIX

A composition was prepared by compounding 100 parts of styrene butadiene block copolymer rubber sold under the tradename "Kraton 3200" by Shell Chemical Company, 30 parts of F-2C adduct and 10 parts of antimony trioxide to yield a composition which when cured seven minutes at 320° F yielded a fire retardant composition by the ASTM D-635 test method having a self-extinguishing time of 3.7 seconds.

EXAMPLE XX

Compositions were prepared by compounding 100 parts of an epoxy resin, 12 parts of diethylene tetramine and 30 parts of F-2C adduct. Alternately a composition was prepared using 100 parts of epoxy resin, 12 parts of diethylenetetramine, 15 parts of antimony trioxide and 30 parts of F-2C adduct. ASTM D-635 test were run on specimens machined from cured castings which were hardened at 25° C and post cured for 16 hours at 120° C. Test results show a self-extinguishing time of 20 seconds for the composition containing no antimony trioxide and a self-extinguishing time of 2 seconds for the composition containing antimony trioxide.

EXAMPLE XXI

Compositions were prepared by compounding 100 parts of a polychloroprene rubber sold under the tradename "Neoprene W" by E. I duPont de Nemours & Company, 60 parts of a high abrasion furnace carbon black, 15 parts of a processing oil sold under the tradename "Circosol 4240" by the Sun Oil Company, 0.5 parts stearic acid, 1 part sulfur, 5 parts zinc oxide, 4 parts magnesium oxide, 1 part 2,2'-benzothiazyl disulfide, 0.5 parts 2-mercaptoimidazolene sold under the tradename "NA-22" by E. I. duPont de Nemours & Company, 0.3 tetramethylthiuram monosulfide and 10 parts of F-2C adduct. The self-extinguishing time for the composition after curing at 320° F for 30 minutes was less than 1 second as determined by the ASTM D-635 test method.

EXAMPLE XXII

Compositions were prepared by compounding and curing 100 parts of an isoprene rubber sold under the tradename "Natsyn 200" by the Goodyear Chemical Company, twenty-five parts of carbon black, three parts of zinc oxide, two parts of stearic acid, one part of a stabilizer sold under the tradename "Age Rite Resin D" by R. T. Vanderbilt Company, Inc., two parts sulfur, 0.8 parts of N-Cyclohexyl-2-benzothiazolesulfonamide sold under the tradename "Santocure NS" by Monsanto Chemical Company, 30 parts of F-2C adduct and fifteen parts of antimony trioxide to provide a composition which was fire retardant by the ASTM D-635 test method. Self-extinguishing time for the composition was 10.7 seconds.

EXAMPLE XXIII

A composition was prepared by compounding and curing 50 minutes at 300° F, 100 parts of a polysulfide rubber sold under the tradename of "Thiokol FA" by the Thiokol Corporation, 60 parts of carbon black, 10 parts of zinc oxide, 0.5 parts of stearic acid, 0.1 parts of diphenylguanidine, 0.3 parts of 2,2'-benzothiazyl-disulfide, 40 parts of F-2C adduct and 20 parts of antimony trioxide to yield a composition which was fire retardant(ASTM D-635 test method) with a self-extinguishing time of 28 seconds.

EXAMPLE XXIV

Compositions were prepared by compounding and curing 10 minutes at 290° F silicone rubber compositions both with antimony trioxide and without antimony trioxide. Compositions were prepared by compounding 100 parts of a silicone rubber sold under the tradename "SE 404" by the General Electric Company, six parts of silicon dioxide sold under the tradename "Cab-O-Sil Ms-7" by the Cabot Corporation, 1,5 parts of 2,4-dichlorobenzyl peroxide sold under the tradename "Luperco CST" by the Lucidol Division of Pennwalt Corporation, 40 parts of F-2C and 20 parts of antimony trioxide to provide a fire retardant composition, which when cured and evaluated by the ASTM D-635 test method, was found to be self-extinguishing, having a burning time of 12 seconds. An identical composition was prepared without antimony trioxide and found to be self-extinguishing after burning 9 seconds.

EXAMPLE XXV

A composition was prepared by compounding and curing 30 minutes at 320° F a urethane rubber sold under the tradename "Genthane S" 100 parts, carbon black 25 parts, stearic acid 2 parts, dicumyl peroxide 40 percent sold under the tradename "DiCup 40C" by Hercules Powder Company, 30 parts of F-2C adduct and 15 parts of antimony trioxide to yield a composition which was fire retardant by the ASTM D-635 test method having a self-extinguishing time of 1.3 seconds.

EXAMPLE XXVI

A composition was prepared by compounding and curing for 30 minutes at 320° F 100 parts acrylic rubber sold under the tradename of "Hycar 4021" by the Goodrich Chemical Company, 40 parts of carbon black, 1 part of stearic acid, 1.5 parts of triethylene tetramine, 2 parts of benzothiazyl sulfide sold under the tradename "Altax" by the R. T. Vanderbilt Company, 10 parts of F-2C adduct and 5 parts of antimony trioxide to yield a composition which was fire retardant by the ASTM D-635 test method with a self-extinguishing time of 2 seconds.

EXAMPLE XXVII

A composition was prepared by compounding and curing for 30 minutes at 320° F, 100 parts of a crosslinking polyethylene sold under the tradename "Alathon 5B" by E. I. duPont de Nemours Company, 20 parts of carbon black, 2.7 parts of dicumyl peroxide, 40% sold under the tradename "DiCup 40C" by Hercules Powder Company, 2 parts of dibasic lead phosphite sold under the tradename "Dyphos" by the National Lead Company, 0.25 parts of a stabilizer sold under the tradename of "Thermolite 25" by the M & T Chemicals, Inc., 30 parts of F-2C adduct and 15 parts of antimony trioxide to produce a composition which when cured was fire retardant by ASTM D-635 test method having a self-extinguishing time of 2 seconds.

EXAMPLE XXVIII

Compositions were prepared by compounding and curing for 30 minutes at 320° F, 100 parts of a chlorosulfonated polyethylene sold under the tradename "Hypalon-40" by E. I. duPont, 5 parts of wood rosin, 40 parts of yellow lead oxide sold under the tradename "Litharge" by the J. T. Baker Company, 3 parts of mercaptobenzothiazole, 10 parts of F-2C adduct and 5 parts of antimony trioxide to yield a composition which when cured was fire retardant by ASTM D-635 test method having a self-extinguishing tme of between 0 and 1 second. An alternate composition was prepared using an additional 10 parts of F-2C and eliminating antimony trioxide to yield a composition which after curing was fire retardant by the ASTM D-635 test method having a self-extinguishing time of 5 seconds.

EXAMPLE XXIX

A composition was prepared by compounding and curing for 30 minutes at 320° F, 100 parts of chlorinated polyethylene sold under the tradename of "CPE-500" by Allied Chemial Company, 40 parts of a processing oil sold under the tradename of "Philrich 5" by the Phillips Petroleum Company, 40 parts of a chlorinated paraffin sold by the Industrial Chemial Division of Hooker Chemical Corporation under the tradename "CP-40", 50 parts of carbon black, 5 parts of an epoxy resin sold under the tradename "Epon 828" by Shell Chemical Company, 7 parts of yellow lead oxide, 2 parts of stearic acid, 1 part of sulfur, 8 parts of 2-mercaptoimidazoline sold under the tradename "NA-22" by E. I. duPont de Nemours Company, 10 parts of F-2C adduct and 5 parts of antimony trioxide to yield a composition which after curing was fire retardant by the ASTM D-635 test method, having a self-extinguishing time of 1 second.

EXAMPLE XXX

A composition was prepared by compounding 65 parts of a polybutene-1 thermoplastic rubber sold by Mobil Chemical Corporation, 32.5 parts of F-2C adduct, 2.5 parts of antimony trioxide to provide a composition which when molded into rods and tested according to the ASTM D-635 test method provided a composition which was fire retardant. The self-extinguishing time was 2 seconds. The rods did not drip during burning.

EXAMPLE XXXI

A composition was made up by compounding 60 parts of a modified polyethylene (ionomer resin) sold under the tradename "Surlyn 1601" by E. I. duPont de Nemours & Company, 13 parts of antimony trioxide and 27 parts of F-2C adduct. The composition was molded into pencil rods measuring 12 cm. × 0.7 cm and tested for fire retardancy according to the ASTM D-635 test method. The self-extinguishing time was 4.2 seconds. The rods did not drip while burning.

EXAMPLE XXXII

A composition was prepared by compounding 60 parts of a polyethylene terephthalate polymer sold under the tradename of "VFR 3801" by the Goodyear Chemical Corporation, 13 parts of antimony trioxide, and 27 parts of F-2C adduct. Compositions were molded into pencil rods and tested by the ASTM D-635 test method. Self-extinguishing time for the composition was less than one second. The rods did not drip while burning.

EXAMPLE XXXIII

A composition was prepared by compounding 60 parts of a high impact polystyrene sold under the tradename "Styron 475", 13 parts of antimony trioxide and 27 parts of F-2C adduct. The composition was molded into pencil rods and tested according to the ASTM D-635 test method. The self-extinguishing time of the compositions was found to be 1.4 seconds. The rods did not drip while burning.

EXAMPLE XXXIV

A composition was made by compounding 60 parts of a styreneacrylonitrile polymer sold under the tradename of "Tyril" by the Dow Chemical Company, 13 parts of antimony trioxide and 27 parts of F-2C adduct. The composition was molded into test bars and tested according to ASTM D-2863 to determine oxygen index. The oxygen index is the minimum amount, in percent, of oxygen in a nitrogen-oxygen mixture which will just support combustion of the composition under test. The oxygen index of the composition was found to be 36.5.

EXAMPLE XXXV — CONTROL

A composition containing 100 parts of "Tyril" was made into pencil rods and tested according to ASTM D-2863 for oxygen index. Test results showed an index of 18.

EXAMPLE XXXVI

A composition was prepared by compounding 60 parts of polyphenylene oxide/polystyrene sold under the tradename of "Noryl" by General Electric Company, 13 parts of antimony trioxide and 27 parts of F-2C adduct. The composition was molded into test bars and tested according to ASTM D-2863 test method for oxygen index. Test results indicate an oxygen index of 40.1.

EXAMPLE XXXVII — CONTROL

A composition containing 100 parts of "Noryl" was made into pencil rods and tested according to ASTM D-2863 test method for oxygen index. Test results indicate an oxygen index of 33.1.

EXAMPLE XXXVIII

A composition was made by compounding 60 parts of polycarbonate sold under the tradename of "Lexan", by General Electric Company, 13 parts of antimony trioxide, 27 parts F-2C. The composition was molded into test bars and tested according to ASTM D-2863 for oxygen index. Test results show an oxygen index of 42.3.

EXAMPLE XXXIX — CONTROL

A composition containing 100 parts of "Lexan" was molded into test bars and tested according to ASTM D-2863 for oxygen index. Test results show an oxygen index of 28.5.

EXAMPLE XL

A composition containing 60 parts of polysulfone resin sold under the tradename "Bakelite P-1700" by the Union Carbide Chemical Corporation, 13 parts of antimony trioxide, and 27 parts of F-2C adduct. The composition was molded into test bars and tested according to ASTM D-2863 test method for oxygen index. Test results indicate an oxygen index of 42.1.

EXAMPLE XLI — CONTROL

A composition containing 100 parts of polysulfone resin sold under the tradename "Bakelite P-1700" by the Union Carbide Chemical Corporation was molded into test bars and tested according to ASTM D-2863 test method for oxygen index. Test results show an oxygen index of 28.5.

EXAMPLE XLII

A phenolic molding compound sold under the tradename of "Durez 11864" by the Durez Division of Hooker Chemical Corporation was compounded with 5% of F-2C adduct based upon the weight of the molding compound together with 1.5% of antimony trioxide based upon the weight of the molding compound. The phenolic molding compound contained 30 to 40% of phenolic resin and was mineral filled. The composition was molded into test bars and tested according to the ASTM D-2863 test method for oxygen index. Results of the test indicate an oxygen index of 59.5.

EXAMPLE XLIII — CONTROL

A phenolic molding compound sold under the tradename of "Durez 11864" was molded into test bars and tested according to ASTM D-2863 test method for oxygen index. Results indicate an oxygen index of 43.5.

EXAMPLE XLIV

A composition was prepared by compounding a diallyl phthalate molding compound sold under the tradename "Durez 22008" by the Durez Division of Hooker Chemical Corporation with 3.5% F-2C adduct and 1% antimony trioxide based upon the weight of the diallyl phthalate molding compound. The diallyl phthalate molding compound contained about 35 to 45 percent diallyl phthalate and was glass filled. The composition was molded into test bars and tested according to the ASTM D-2863 test method. Results indicate an oxygen index of 28.8.

EXAMPLE XLV — CONTROL

A diallyl phthalate molding compound sold under the tradename "Durez 22008" by the Durez Division of Hooker Chemical Corporation was molded into test bars and tested according to ASTM D-2863 test method for oxygen index. Results indicate an oxygen index of 21.5. The diallyl phthalate molding compound contained approximately 35 to 45% diallyl phthalate and was glass filled.

EXAMPLE XLVI

A composition was prepared by compounding 65 parts of polypropylene sold under the tradename of "Merchant Powder" by the Avisun Company, Marcus Hook, Pennsylvania, 32 parts of F-2C adduct and 3 parts of antimony trioxide. The composition was molded into test bars and tested according to the ASTM D-635 Test Method. The composition had a self-extinguising time of 6.3 seconds and did not drip during burning.

EXAMPLE XLVII

A composition was prepared by compounding 60 parts of an ethylene vinyl acetate copolymer, sold under the tradename of "Levapren 450" by Farbenfabriken-Bayer, A. G., 27 parts of F-2C adduct, and 13 parts of antimony trioxide. The composition was molded into test bars and tested according to the ASTM D-635 Test Method. The composition showed a self-extinguishing time of less than one second and the composition did not drip during burning.

EXAMPLE XLVIII

A composition was prepared by compounding 60 parts of a polyvinyl acetal resin sold under the tradename of "Delrin" by the E. I. duPont de Nemours & Company with 27 parts of F-2C adduct and 13 parts of antimony trioxide. The composition was molded into test bars and tested according to the ASTM D-2863 test method. Results indicate an oxygen index of 23.5 ± 0.5.

EXAMPLE XLVIX — CONTROL

A composition containing 100 parts of polyvinyl acetal sold under the tradename "Delrin" was molded into test bars and tested according to the ASTM D-2863 for oxygen index. Test results shown an oxygen index of less than 16. It should be noted that 16 is the minimum oxygen index which can be measured using the test equipment.

Various changes and modifications can be made in the products of the instant invention without departing from the spirit and the scope thereof. The various embodiments of the invention disclosed herein serve to further illustrate the invention but are not intended to limit it.

What is claimed is:

1. A fire retardant polymeric composition comprising a polymer and an effective fire retardant proportion of a compound of the formula:

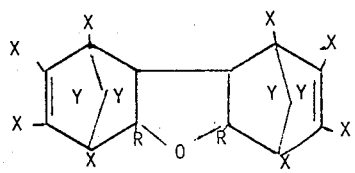

wherein X is selected from the group consisting of fluorine, chlorine, and bromine, Y is selected from the group consisting of fluorine, chlorine, bromine, alkyl, haloalkyl, alkoxy and haloalkoxy and each R is individually selected from the group consisting of hydrogen and alkyl.

2. The composition of claim 1 wherein a compound selected from the group consisting of an antimony compound, an arsenic compound and a bismuth compound is incorporated therein.

3. The composition of claim 2 wherein said antimony compound is antimony trioxide.

4. The composition of claim 3 wherein X is selected from the group consisting of chlorine and bromine, Y is selected from the group consisting of chlorine and bromine, and wherein R is selected from the group consisting of hydrogen and methyl.

5. The composition of claim 4 wherein the compound of the formula is 1,2,3,4,6,7,8,9,10,10,11,11,-dodecachloro-1,4,4a,5a,6,9,9a,9b-octahydro-1,4:6,9-dimethanodibenzofuran.

6. The composition of claim 5 wherein the polymer is a graft copolymer of polybutadiene, styrene and acrylonitrile.

7. The composition of claim 5 wherein the polymer is styrenebutadiene rubber.

8. The composition of claim 5 wherein the polymer is a terpolymer of ethylene, propylene and a diene.

9. The composition of claim 5 wherein the polymer is butyl rubber.

10. The composition of claim 5 wherein the polymer is styrene butadiene sponge rubber.

11. The composition of claim 1 wherein the compound of the formula is 1,2,3,4,6,7,8,10,10,11,11,-dodecachloro- 1,4,4a,5a,6,9,9a,9b-octahydro-1,4:6,9-dimethanodibenzofuran.

12. The composition of claim 11 wherein the polymer is nylon.

13. The composition of claim 11 wherein the polymer is polystyrene.

14. The composition of claim 11 wherein the polymer is an epoxy resin.

15. The composition of claim 11 wherein the polymer is a neoprene rubber.

16. The composition of claim 11 wherein the polymer is a silicone rubber.

17. The composition of claim 11 wherein the polymer is a chlorosulfonated polyethylene.

18. The composition of claim 5 wherein the polymer is polystyrene.

19. The composition of claim 5 wherein the polymer is polyethylene.

20. The composition of claim 5 wherein the polymer is an ethylenepropylene copolymer.

21. The composition of claim 5 wherein the polymer is polymethylmethacrylate.

22. The composition of claim 5 wherein the polymer is polyvinyl chloride.

23. The composition of claim 5 wherein the polymer is a polyester.

24. The composition of claim 5 wherein the polymer is natural rubber.

25. The composition of claim 5 wherein the polymer is a polybutadiene rubber.

26. The composition of claim 5 wherein the polymer is a nitrile butadiene rubber.

27. The composition of claim 5 wherein the polymer is a styrene butadiene block copolymer rubber.

28. The composition of claim 5 wherein the polymer is an epoxy resin.

29. The composition of claim 5 wherein the polymer is isoprene rubber.

30. The composition of claim 5 wherein the polymer is polysulfide rubber.

31. The composition of claim 5 wherein the polymer is silicone rubber.

32. The composition of claim 5 wherein the polymer is a urethane rubber.

33. The composition of claim 5 wherein the polymer is an acrylic rubber.

34. The composition of claim 5 wherein the polymer is chlorosulfonated polyethylene.

35. The composition of claim 5 wherein the polymer is polybutene thermoplastic rubber.

36. The composition of claim 5 wherein the polymer is polyethylene teraphthalate.

37. The composition of claim 5 wherein the polymer is high impact polystyrene.

38. The composition of claim 5 wherein the polymer is a polyethylene ionomer resin.

39. The composition of claim 5 wherein the polymer is chlorinated polyethylene.

40. The composition of claim 5 wherein the polymer is a crosslinked polyethylene.

41. The composition of claim 5 wherein the polymer is styrene acrylonitrile.

42. The composition of claim 5 wherein the polymer is a mixture of polyphenylene oxide and polystyrene.

43. The composition of claim 5 wherein the polymer is a polycarbonate.

44. The composition of claim 5 wherein the polymer is a polysulfone.

45. The composition of claim 5 wherein the polymer is a phenolic resin.

46. The composition of claim 5 wherein the polymer is a diallyl phthalate resin.

47. The composition of claim 5 wherein the polymer is polypropylene.

48. The composition of claim 5 wherein the polymer is an ethylene vinyl acetate copolymer.

49. The composition of claim 5 wherein the polymer is a polyvinyl acetal resin.

50. A flame retardant polymeric composition comprising from about 60–95% of said polymeric composition of a polymer selected from the group consisting of acrylonitrile-butadiene-styrene polymers, polyurethanes, polyethylenes, polypropylenes, acrylate polymers, poly(vinyl chloride), polystyrene, polyisoprene, polybutadiene, polyisobutylenes, polyamides, ethylene-propylene copolymers, polycarbonates, and polyphenylene oxide polymers blended with from about 5-40% of a furan adduct of the general formula:

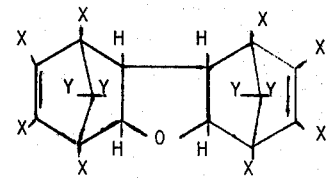

wherein X is selected from the group consisting of fluorine, chlorine and bromine; Y is selected from the group consisting of fluorine, chlorine, bromine, alkyl, alkoxy, and halogen-substituted alkyl and halogen-substituted alkoxy radicals.

51. The composition of claim 50 wherein X and Y are selected from the group consisting of chlorine, bromine and fluorine.

52. The composition of claim 50 wherein the five retardant compound is the diadduct of hexachlorocyclopentadiene and furan, blended with an ABS resin.

* * * * *

UNITED STATES PATENT OFFICE

CERTIFICATE OF CORRECTION

Patent No. 3,991,011      Dated November 9, 1976

Inventor(s) Harry W. Marciniak, et al.

It is certified that error appears in the above-identified patent and that said Letters Patent are hereby corrected as shown below:

At (54) of the title page, for "Diels-Adler", read "Diels-Alder.

At Column 1, line 3, for "Diels-Adler", read "Diels-Alder".

At Column 1, lines 8-9, for "June 28, 1971, now abandoned, which is", read "June 28, 1971, which is".

At Column 1, line 21, for "unexpectely", read "unexpectedly".

At Column 2, line 41, for "1, 2, 3, 4, 5, 6, 7, 8, 9, 10, 10, 11, 11 -dodecachlorol 4, 4a-" read "1, 2, 3, 4, 6, 7, 8, 9, 10, 10, 11, 11 - dodecachloro- 1, 4, 4a".

At Column 3, line 36, for "polyamide polyamide polymers", read "polyamide polymers".

At Column 3, line 42, for "s", read "as".

At Column 4, line 21, for "degradaton", read "degradation".

At Column 4, line 46, for "antimonite and potassium" read "antimonite or potassium".

UNITED STATES PATENT OFFICE
CERTIFICATE OF CORRECTION

Patent No. 3,991,011            Dated November 9, 1976

Inventor(s) Harry W. Marciniak et al.

It is certified that error appears in the above-identified patent and that said Letters Patent are hereby corrected as shown below:

At Column 6, line 2, for "Strengt", read "Strength".

At Column 15, line 10 for "self-extinguising" read "self-extinguishing".

At Column 16, line 28, for "8, 10", read "8, 9, 10".

At Column 18, line 32, for "five" read "fire".

Signed and Sealed this

Twelfth Day of June 1979

[SEAL]

Attest:

RUTH C. MASON  
Attesting Officer

DONALD W. BANNER  
Commissioner of Patents and Trademarks